(12) United States Patent
Lv et al.

(10) Patent No.: US 10,127,057 B2
(45) Date of Patent: Nov. 13, 2018

(54) METHOD AND APPARATUS FOR DYNAMICALLY IMPLEMENTING APPLICATION FUNCTION

(71) Applicant: BAIDU ONLINE NETWORK TECHNOLOGY (BEIJING) CO., LTD., Beijing (CN)

(72) Inventors: Wenyu Lv, Beijing (CN); Jun Li, Beijing (CN); Daolong Wang, Beijing (CN); Meng Liu, Beijing (CN); Xiaowei Liu, Beijing (CN); Yufei Yan, Beijing (CN); Yinyin Jin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 103 days.

(21) Appl. No.: 15/301,363

(22) PCT Filed: Oct. 27, 2015

(86) PCT No.: PCT/CN2015/092959
§ 371 (c)(1),
(2) Date: Sep. 30, 2016

(87) PCT Pub. No.: WO2016/124013
PCT Pub. Date: Aug. 11, 2016

(65) Prior Publication Data
US 2017/0185431 A1 Jun. 29, 2017

(30) Foreign Application Priority Data
Feb. 3, 2015 (CN) .......................... 2015 1 0055952

(51) Int. Cl.
*G06F 9/445* (2018.01)
*H04L 29/06* (2006.01)
(Continued)

(52) U.S. Cl.
CPC ............ *G06F 9/44521* (2013.01); *G06F 8/30* (2013.01); *G06F 9/44505* (2013.01);
(Continued)

(58) Field of Classification Search
CPC ... G06F 9/44521; G06F 21/57; H04L 63/0272
See application file for complete search history.

(56) References Cited

U.S. PATENT DOCUMENTS

2012/0158893 A1* 6/2012 Boyns ............... G06F 17/30905
709/217

FOREIGN PATENT DOCUMENTS

| CN | 101441624 A | 5/2009 |
|----|-------------|--------|
| CN | 103095839 A | 5/2013 |

(Continued)

OTHER PUBLICATIONS

International Search Report for PCT/CN2015/092959 dated Jan. 13, 2016, 2 pages.

*Primary Examiner* — Umut Onat
(74) *Attorney, Agent, or Firm* — Nixon Peabody LLP

(57) ABSTRACT

A method and apparatus for dynamically implementing an application function is provided, wherein the method includes sending status information to a network device; obtaining a layout information function configuration file fed back from the network device; and creating a window body and a program control based on the layout information function configuration file and establishing a link between the program control and the application function. By creating, through a layout information function configuration file, a display window and a program control in a terminal device, the present invention creates a link between the program control and the application function, so as to achieve fast development, adaptation, and release of the application; besides, personalized adaptation for a specific
(Continued)

resolution, launching of a new function, and problem fixing may be implemented without releasing a new-version application.

15 Claims, 9 Drawing Sheets

(51) Int. Cl.
*G06F 8/30* (2018.01)
*G06F 21/51* (2013.01)
*H04W 4/60* (2018.01)
*G06F 21/57* (2013.01)
*G06F 3/0481* (2013.01)

(52) U.S. Cl.
CPC .......... *G06F 21/51* (2013.01); *H04L 63/0272* (2013.01); *H04W 4/60* (2018.02); *G06F 3/0481* (2013.01); *G06F 21/57* (2013.01); *G06F 2221/033* (2013.01)

(56) References Cited

FOREIGN PATENT DOCUMENTS

| | | |
|---|---|---|
| CN | 104007991 A | 8/2014 |
| CN | 104557174 A | 5/2015 |
| WO | WO 2005/045699 A1 | 5/2005 |

\* cited by examiner

METHOD AND APPARATUS FOR DYNAMICALLY IMPLEMENTING APPLICATION FUNCTION

CROSS-REFERENCE OF RELEVANT APPLICATIONS

The present application is a U.S. national stage under 35 U.S.C. § 371 of International Application No. PCT/CN2015/092959, filed on Oct. 27, 2015, which claims a priority of the Chinese patent application No. 201510055952.8 entitled "Method and Apparatus for Dynamically Implementing an Application Function," filed on Feb. 3, 2015. Each of the above-referenced applications is incorporated herein by reference to their entireties.

TECHNICAL FIELD

The present application relates to the field of computer devices, and more specifically relates to a method and apparatus for dynamically implementing an application function based on a mobile terminal.

BACKGROUND

In order to satisfy user's individual demands on terminal devices, the existing terminal device manufacturers release terminal devices with different screen sizes, while a screen resolution of a terminal device also constantly changes with emergence of large-screen terminal devices. Due to large discrepancies between resolutions, fast and convenient personalized adaptation becomes a trend for future development of terminal devices, so as to present an application with an optimal effect under different resolutions. However, in order to adapt the application for different resolutions, developers have to redesign and develop to achieve a personalized adaptation to the new resolution, while after completion of the development, adaptation to a specific resolution can only be solved through releasing a new-version application, and finally, in order to better present the application effect and function, the user has to re-install the adapted new-version application. This results in a longer period from start of the adaptation to release of normal application.

In addition, for a released application, in case that a new function needs to be launched or problems needs to be fixed, a new-version application has to be released, and the user needs to re-download and install the new-version application, which causes a complicated operation and is disadvantageous for promotion of the application.

SUMMARY OF THE INVENTION

A technical problem to be solved by the present application is that, in the prior art, personalized adaptation to different resolutions, launching of a new function, and problem fixing can only be implemented by re-installing a new-version application.

According to an embodiment in an aspect of the present application, there is provided a method for dynamically implementing an application function, wherein the method includes:

sending status information to a network device;

obtaining a layout information function configuration file fed back from the network device; and creating a window and a program control based on the layout information function configuration file, and establishing a link between the program control and the application function.

According to an embodiment in another aspect of the present application, there is provided an apparatus for dynamically implementing an application function, wherein the apparatus includes:

a unit configured to send status information to a network device;

a unit configured to obtain a layout information function configuration file fed back from the network device; and a unit configured to create a window body and a program control based on the layout information function configuration file, and to establish a link between the program control and the application function.

The present embodiment may create, through a layout information function configuration file, a display window and a program control in a terminal device, thereby creating a link between the program control and the application function, so as to achieve fast development, adaptation, and release of the application; besides, personalized adaptation for a specific resolution, launching of a new function, and problem fixing may be implemented without releasing a new-version application.

Those skilled in the art would understand that although detailed description hereinafter will be made with reference to the illustrated embodiments and drawings, the present application is not limited to these embodiments. Instead, the scope of the present application is broad, and it is intended to limit the scope of the present application only through the appended claims.

BRIEF DESCRIPTION OF THE PREFERRED EMBODIMENTS

Other features, objectives, and advantages of the present application will become more apparent by reading the detailed description of the non-limiting embodiments with reference to the accompanying drawings.

Same or similar reference numerals in the drawings represent same or similar components.

DETAILED DESCRIPTION OF THE PREFERRED EMBODIMENTS

Figure 1:
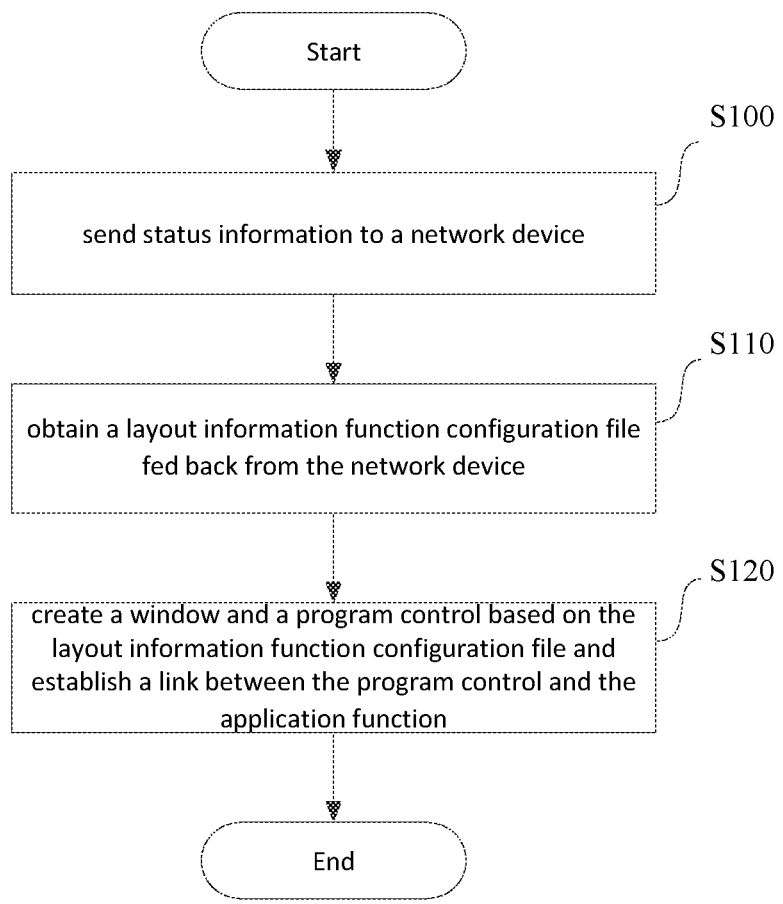
FIG. 1 illustrates a schematic flow diagram of a method for dynamic implementing an application function according to an embodiment of the present application.

Before discussing the exemplary embodiments in more detail, It should be mentioned that some exemplary embodiments are described as processing or methods in the form of flow diagrams. Although a flow diagram depicts respective operations as being sequentially processed, many operations therein may be implemented in parallel, concurrently or simultaneously. Besides, various operations may be re-ordered. When the operations are completed, the processing may be terminated. However, there may include additional steps not included in the accompanying drawings. The processing may correspond to a method, a function, a specification, a sub-routine, a sub-program, etc.

The "computer device" herein, also referred to as "computer," refers to a smart electronic device that may perform a predetermined processing procedure such as numerical calculation and/or logical calculation by running a predetermined program or instructions, which may include a processor and a memory, such that the predetermined processing process is executed by executing pre-stored program instructions in the memory by the processor, or the predetermined processing process is implemented by a hardware such as ASIC, FPGA, DSP, or the predetermined processing process is implemented by a combination thereof. The computer device may include, but not limited to, a server, a personal computer, a laptop, a tablet computer, and a smart phone, etc.

The computer device may include a user equipment and a network device, wherein the user equipment may include, but not limited to, a computer, a smart phone, a PDA, etc.; the network device may include, but not limited to, a single network server or a server group consisting of a plurality of network servers, or a cloud consisting of mass computers or network servers based on cloud computing, wherein the cloud computing is a kind of distributed computing, which is a super virtual computer consisting of a group of loosely coupled computer sets, wherein the computer device may independently run to implement the present application, and may access to a network and implement the present application by interfacing with other computing devices in the network. The network where the computer device is located may include, but not limited to, Internet, Wide Area Network, Metropolitan Area Network, Local Area Network, VPN network, etc.

It should be noted that the user equipment, the network device, and the network are only examples, and other exiting or future possibly emerging computer devices or networks, if applicable to the present application, should also be included within the protection scope of the present application and are incorporated here by reference.

The methods discussed infra (some of which are illustrated through flow diagrams) may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present application. Instead, the present application may be specifically implemented through many alternative embodiments. Therefore, it should not be interpreted that the present application is only limited to the embodiments illustrated here.

However, it should be understood that although terms "first," "second" might be used herein to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used herein includes any and all combinations of one or more associated items as listed.

It should be understood that when one unit is "connected" or "coupled" to a further unit, it may be directly connected or coupled to the further unit, or an intermediate unit may exist. In contrast, when a unit is "directly connected" or "directly coupled" to a further unit, an intermediate unit does not exist. Other terms (e.g., "disposed between" VS. "directly disposed between," "adjacent to" VS. "immediately adjacent to," and the like) for describing a relationship between units should be interpreted in a similar manner.

The terms used herein are only for describing preferred embodiments, not intended to limit exemplary embodiments. Unless otherwise indicated, singular forms "a" or "one" used herein further intends to include plural forms. It should also be appreciated that the terms "comprise" and/or "include" used herein prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Hereinafter, the present application will be described in further detail with reference to the accompanying drawings.

FIG. 1 illustrates a schematic flow diagram of a method for dynamic implementing an application function according to an embodiment of the present application.

The method of the present embodiment is mainly implemented through a user equipment; the user equipment may include, but not limited to, a desktop computer, a laptop computer, a tablet computer, and a smart phone, etc.

It should be noted that the user equipment is only exemplary, and other existing or future possibly emerging network device and user equipment, if applicable to the present application, should also be incorporated within the protection scope of the present application and is incorporated here by reference.

The method according to the present embodiment includes step S100, step S110, and step S120.

In step S100, a user equipment sends status information to a network device.

Figure 7:
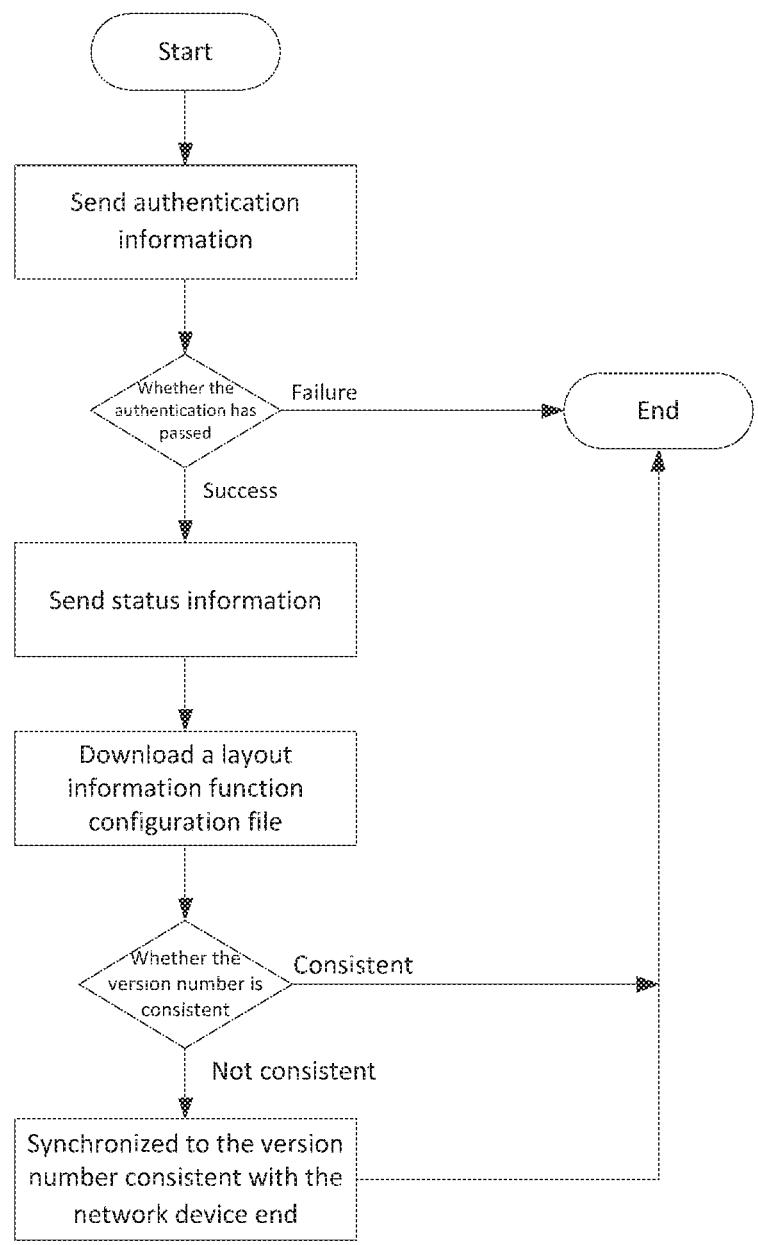
FIG. 7 illustrates a schematic flow diagram of synchronizing a layout file and a function configuration file according to an embodiment of the present application.

Optionally, as illustrated in FIG. 7, the user equipment may first send generated authentication information to the network device, such that the network device performs authentication processing. After authentication of the user equipment according to the authentication information passes, the network device returns an authentication result to the user equipment.

If the user equipment has passed registration verification at the network device, the step of authentication may be omitted; instead, the status information is directly transmitted to the network device, wherein the status information may include a model, resolution, and system version number of the user equipment, as well as identification information of the application installed in the user equipment, the identification information being capable of uniquely identifying the application, including, but not limited to, a name of an application packet, a uniform resource identifier, and picture information that may uniquely identify the application, etc.

In step S110, the user equipment obtains a layout information function configuration file fed back from the network device.

After receiving the status information transmitted by the user equipment, the network device returns to the user equipment a service address of the layout information function configuration file corresponding to the status information. The user equipment is linked to the service address to download the layout information function configuration file, the layout information function configuration file may include a layout file and a function configuration file.

The service address is for indicating the user equipment to download the layout information function configuration file. Optionally, the service address may include download address information corresponding to a plurality of versions of the application under different kinds of systems, e.g., download address information corresponding to a plurality of versions of different kinds of operating systems such as a computer version, Android version, IOS version, etc.

Optionally, the user equipment may first check whether a locally stored layout and a version number of the configuration information are synchronized with the layout information function configuration file, before downloading the layout information function configuration file. If not synchronous, the layout information function configuration file is downloaded; if synchronous, it is indicated that the user equipment needn't update a local specific application.

Optionally, the user equipment may also decrypt and/or check the layout information function configuration file, after downloading the layout information function configuration file, wherein the file transmitted between the user equipment and the network device may be encrypted through pre-agreed cryptograph and encryption certificate. After downloading the layout information function configuration file, the user equipment may decipher the layout information function configuration file based on the pre-agreed cryptograph and encryption certificate, so as to obtain the corresponding layout file and function configuration file. Regardless of whether the layout information function configuration file is deciphered, the user equipment may check the layout file and the function configuration file in the layout information function configuration file, after downloading the layout information function configuration file, so as to determine the integrity and safety of the layout information function configuration file.

It should be noted that the example above is only for better illustrating the technical solution of the present application, not for limiting the present application. Those skilled in the art should understand that any implementation manner of receiving a layout information function configuration file fed back from the network device should be included within the scope of the present application.

In step S120, the user equipment creates a window and a program control according to the layout information function configuration file and establishes a link between the program control and the application function.

Specifically, the user equipment creates a window according to a layout file in the layout information function configuration file, creates respective controls and initializes statuses and contents of respective controls according to a function configuration file in the layout information function configuration file, and creates a link to an application function for respective controls of the window according to the function configuration file.

For example, a maximum resolution of the mobile terminal device supported by a mobile client of the original Baidu Cloud Manager is 1280×720. However, now mobile terminal devices with a 2K resolution (i.e., 2560×1440) have been emerged in the market; therefore, it is needed to release a mobile client for a new-version Baidu Cloud Manager so as to support the mobile terminal devices with a 2K resolution.

With the method for dynamically implementing an application function provided in the present embodiment, the user equipment first sends status information including a resolution to a network device. Layout files and function configuration files corresponding to respective resolutions are stored on the network device, and are managed as a separate file directory, which guarantees separate storage of relevant files for individual resolutions, wherein the directory for saving the layout files and function configuration files with 2K resolution corresponding to the new version may be named as 2K. When determining, according to the status information, that the resolution for the corresponding user equipment is 2K, the network device sends to the user equipment the storage address for the 2K-resolution layout file and function configuration file, and the user equipment downloads the 2K-resolution layout file and function configuration file from the storage address. Finally, the user equipment creates the window and program control for 2K resolution according to the 2K-resolution layout file and function configuration file, creates a link between the program control and the application link, such that when the user opens the mobile client of the Baidu Cloud Manager in the user equipment, the updated Baidu Cloud Manager will be displayed in the user equipment with a 2K resolution.

Figure 2:
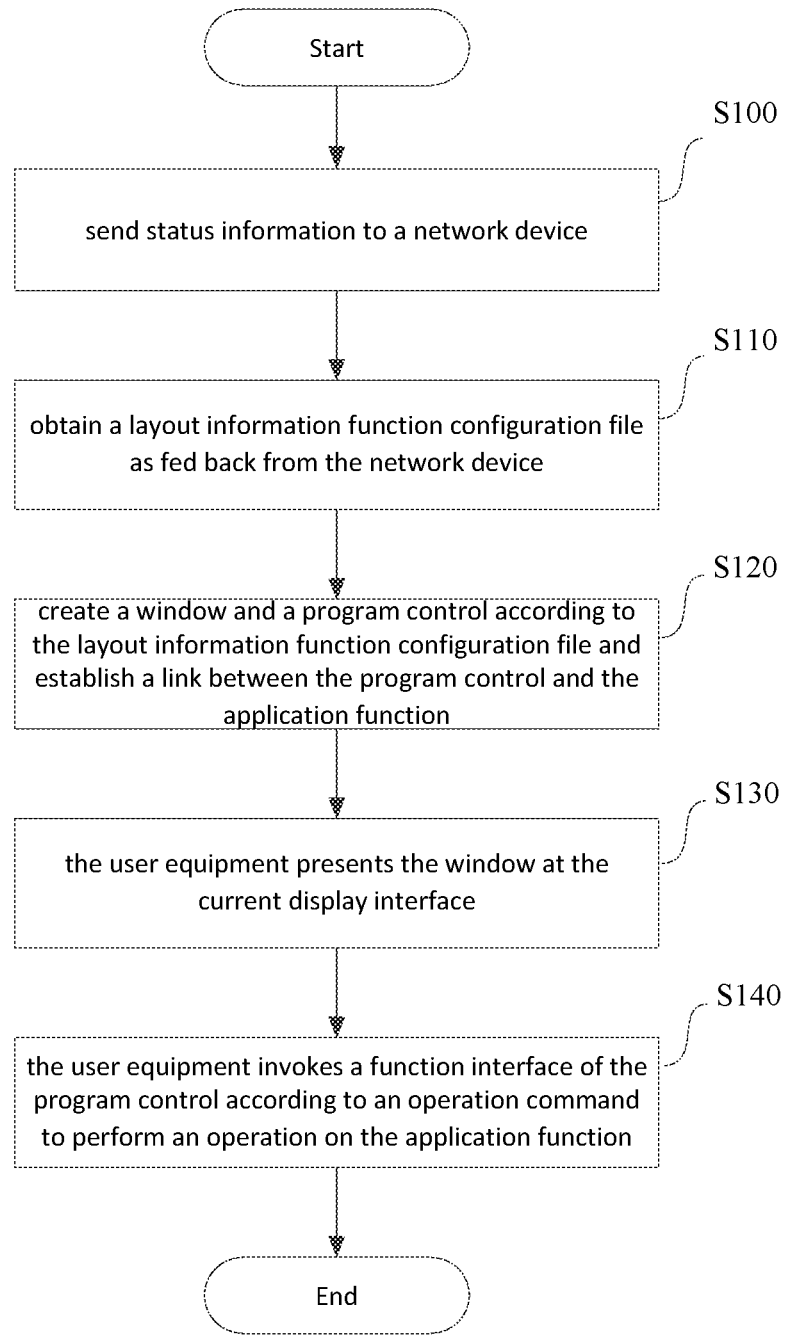
FIG. 2 illustrates a schematic flow diagram of a method for dynamic implementing an application function according to another embodiment of the present application.

FIG. 2 illustrates a schematic flow diagram of a method for dynamic implementing an application function according to another embodiment of the present application. The method of the present embodiment is mainly implemented by a user equipment, wherein any explanation to the user equipment with reference to the embodiment in FIG. 1 is incorporated herein by reference.

The method according to the present embodiment includes step S100, step S110, step S120, step S130, and step S140, wherein the step S100, step S110, and step S120 have been described in detail with reference to FIG. 1, which will not be detailed here.

In step S130, the user equipment presents the window at a present display interface.

Specifically, after the user equipment completely creates a window, it may present the created window at the current display interface and initialize the window data.

Figure 8:
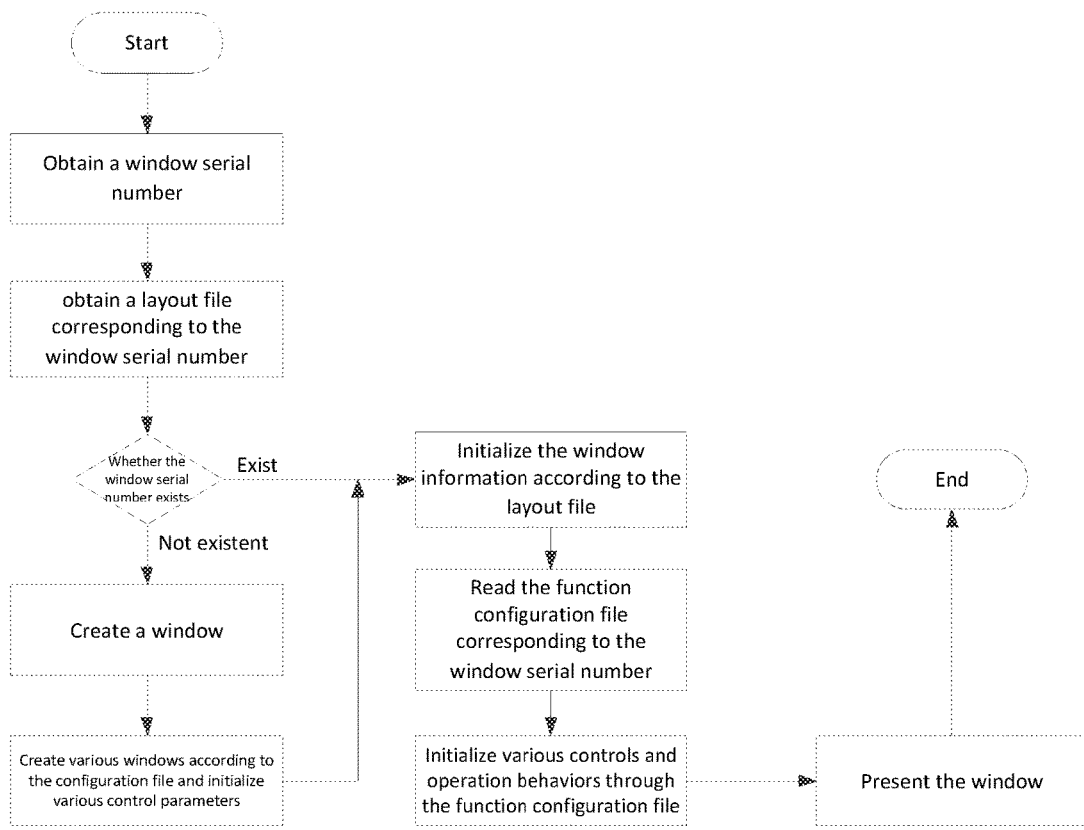
FIG. 8 illustrates a schematic flow diagram of window loading according to an embodiment of the present application.

Optionally, the step of presenting the window at the current display interface is illustrated in FIG. 8, which may include:

obtaining a window serial number and a corresponding layout file from the layout information function configuration file;

if the terminal device has the window serial number locally, reading a function configuration file corresponding to the window serial number in the layout information function configuration file;

presenting various controls and operation behaviors of the window on the current display interface through the function configuration file.

Specifically, this step will be illustrated with an example that the window created by the user equipment is a login window. After the user equipment downloads the layout information function configuration file, when it is needed to present the login window, it may be first searched in a window manager whether the login window has been created. If the created login window already exists in the window manager, a layout file of the created login window is first obtained from a file directory corresponding to the screen resolution of the user equipment, and a function configuration file corresponding to the serial number of the login window is obtained from the layout file, so as to present various controls and operation behaviors of the login window at the current display interface through the function configuration file.

For example, during a procedure of initializing the login window, two tags may be created based on the function configuration file, titles of the two tags being "account number" and "password," respectively; then, two input boxes are created, one input box displaying "enter the account number," while the other input box displaying "enter the password"; finally, a "login" button is created, and then according to coordinate positions in the layout file, presenting positions of various controls are set.

Optionally, the step of presenting the window at the current display interface may also include:

if the user equipment does not have the window serial number locally, creating a window corresponding to the window serial number;

creating respective controls corresponding to the window serial number based on the layout information function configuration file and initializing parameter settings of the various controls.

Specifically, if the user equipment does not have the window serial number acquired from the layout information function configuration file locally, it indicates that the user equipment locally does not have the window corresponding to the window serial number. Therefore, the user equipment locally creates a window corresponding to the window serial number, creates various controls corresponding to the window number according to the layout information function configuration file, and initializes parameter settings of various controls.

An example of adding a "BT download button" on a mobile client of Baidu Cloud Manager will be taken. Since the current mobile client does not provide a function of BT download, while the Baidu Cloud Server already adds a BT download function to an offline download function, it is only needed to add a "BT download button" on the mobile client of the Baidu Cloud Manager and associate a click event for the button with obtaining a specific file from the Baidu Cloud Server through "BT Download." Specifically, after creating a window corresponding to the "BT download button," the user equipment creates various controls corresponding to the "BT download button" according to the layout information function configuration file of BT download and initializes parameter settings of the various controls, thereby performing an operation of adding a "BT download button" to the mobile client of the Baidu Cloud.

In step S140, the user equipment invokes a function interface of the program control according to an operation command to perform an operation on the application function.

Specifically, in the current displayed login window, the user sends a login request signaling by clicking onto a "login" button; then when the user equipment creates the "login" button in the login window, a click event corresponding to the "login" button may be associated with a Send Request operation, and associated with obtaining information such as a service path address associated with the login request from the function configuration file. When clicking onto the "login" button, the Send Request operation is activated, and a login service path address is set, and meanwhile the currently entered user account number and password are obtained in the meanwhile, initiation of the login command is completed, and window jump processing or information prompt is performed according to a login result as returned.

A user's operation of logging in the Baidu Cloud Manager will be taken as an example. When the user enters a Baidu account number and password in "Account Number" and "Password" input boxes, respectively, and clicks onto the "login" button, the user equipment displays the data stored in the Baidu Cloud in the window according to a Baidu Cloud service path address corresponding to the Baidu account number and password, thereby implementing an operation on an application function of the Baidu Cloud.

It should be noted that the example above is only for better understanding the technical solution of the present application, not for limiting the present application. Those skilled in the art should understand that any manner in which a window including the login window employs the method above to dynamically implement an application function should be included within a scope of the present application.

Figure 3:
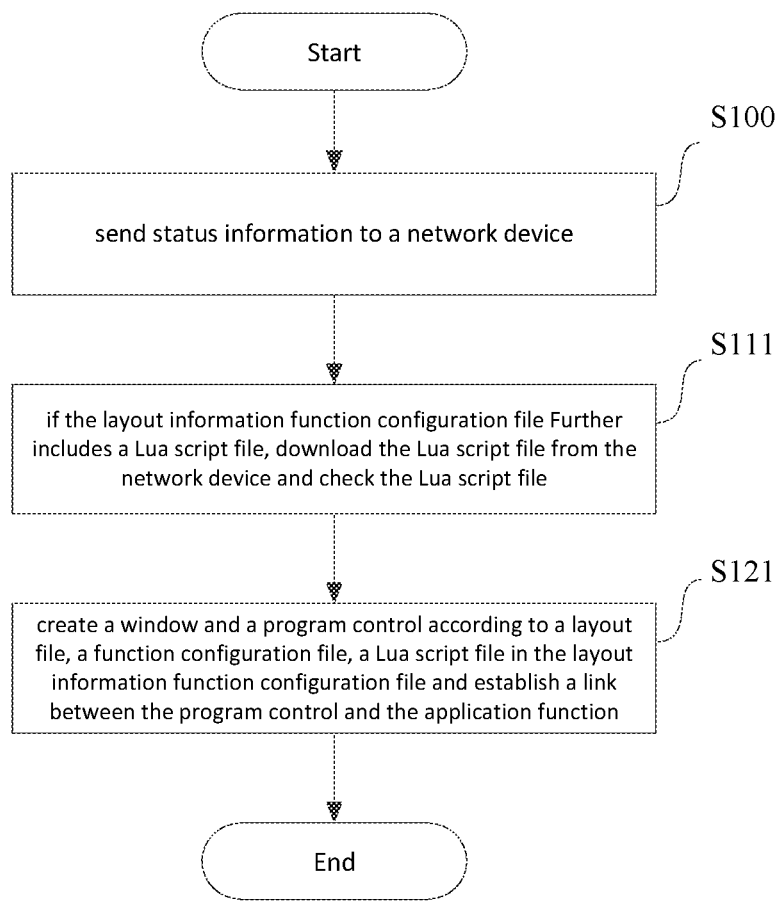
FIG. 3 illustrates a schematic flow diagram of a method for dynamic implementing an application function according to a further embodiment of the present application.

FIG. 3 illustrates a schematic flow diagram of a method for dynamic implementing an application function according to a further embodiment of the present application. The method of the present embodiment is mainly implemented by a user equipment, wherein any explanation of the user equipment in the embodiment with reference to FIG. 1 is incorporated here by reference.

The method according to the present embodiment includes step S100, step S110, and step S120. Wherein, the step S110 further includes step S111, and the step S120 further includes step S121. The step S100 has been described in detail in FIG. 1, which will not be detailed here.

In step S111, if the layout information function configuration file further includes a Lua script file, the user equipment downloads the Lua script file from the network device and checks the Lua script file.

The Lua script file is a script language file embedded in an application so as to provide a flexible and customized function for the application. Through the Lua script file, extension of a new function of the application may be achieved.

Specifically, after receiving the status information sent by the user equipment, the network device returns to the user equipment a service address of the layout information function configuration file corresponding to the status information. The user equipment is linked to the service address to download the layout information function configuration file, the layout information function configuration file includes a layout file, a function configuration file, and a Lua script file.

Optionally, before downloading the layout information function configuration file, the user equipment may first check whether a version number of layout and configuration information as locally stored is synchronized with the layout information function configuration file. If not, the layout information function configuration file is downloaded; if yes, it is indicated that the user equipment needn't update a local specific application.

Optionally, the user equipment may also decipher and/or check the layout information function configuration file, after downloading the layout information function configuration file. Wherein, the file transmitted between the user equipment and the network device may be encrypted through pre-agreed cryptograph and encryption certificate. After downloading the layout information function configuration file, the user equipment may decipher the layout information function configuration file based on the pre-agreed cryptograph and encryption certificate, so as to obtain the corresponding layout file, function configuration file, and Lua script file. Regardless of whether the layout information function configuration file is deciphered, the user equipment may check the layout file, the function configuration file, and the Lua script file in the layout information function configuration file after downloading the layout information function configuration file, so as to determine the integrity and safety of the layout information function configuration file.

It should be noted that the example above is only for better illustrating the technical solution of the present application, not for limiting the present application. Those skilled in the art should understand that any implementation manner of receiving a layout information function configuration file fed back from the network device should be included within the scope of the present application.

In step S121, the user equipment creates a window and a program control according to the layout file, the function configuration file, and the Lua script file in the layout information function configuration file, and establishes a link between the program control and the application function.

Figure 9:
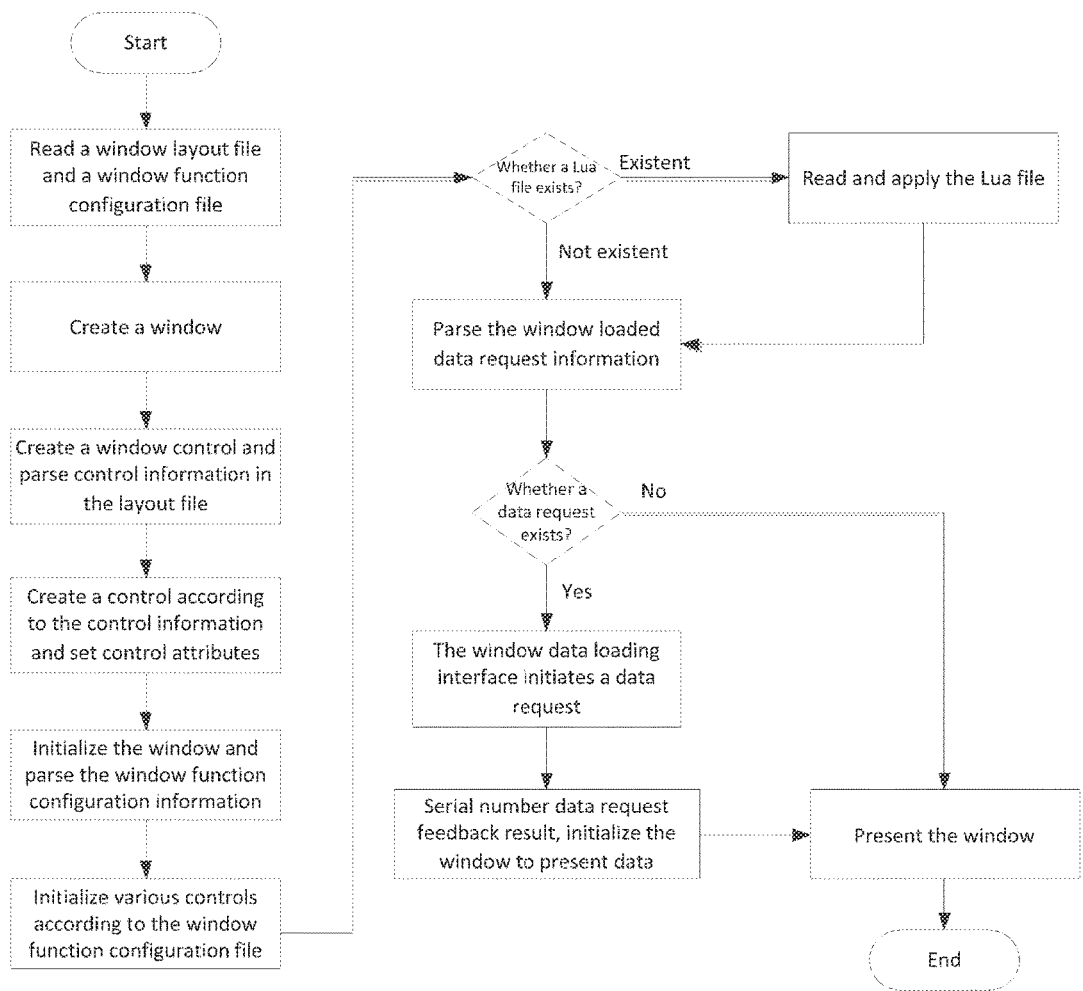
FIG. 9 illustrates a schematic flow diagram of implementing an application function of a window according to a layout file according to an embodiment of the present application.

Specifically, as illustrated in FIG. 9, the user equipment creates a window according to a layout file in the layout information function configuration file, creates various controls according to a function configuration file, and initializes various control states. If the layout information function configuration file has a Lua file, the window is parsed to load data request information; and if the data request information exists, the window data loading interface initiates a data request, and initializes window presenting data according to a feedback to the data request. Finally, the user equipment presents the window.

An example of adding an automatic cloud backup function to the client of the Baidu Cloud Manager is taken. Because the current Baidu Cloud Manager does not have an automatic cloud backup function, while the new version Baidu Cloud Manager client has been added the automatic cloud backup function. With the method for dynamically implementing an application function provided in the embodiment, the automatic cloud backup function is implemented through extending of the Lua script file, and the Lua script file is managed and maintained by the network device. After the user equipment installed with the old-version client of the Baidu Cloud Manager obtains from the network device a layout information function configuration file including a layout file, a function configuration file, and a Lua script file, it may first create a button named "automatic cloud backup" through a layout file, and update the "automatic cloud backup" button to a right-lower corner of the main window of the Baidu Cloud Manager client; then creates an "automatic backup" address directory at the user equipment through the function configuration file, e.g., creating a folder named "automatic backup" under a root directory; finally, creates a link between the "automatic backup" folder and the Baidu Cloud Server through the Lua script file, and sets that the data in the "automatic backup" folder is synchronized with a Baidu Cloud database every a predetermined time, without a need of downloading a new version Baidu Cloud client installation file, and launching of the automatic cloud backup function may be implemented only by downloading the layout information function configuration file.

It should be noted that the above example is only for better illustrating the technical solution of the present application, not for limiting the present application. Those skilled in the art should understand that any manner in which any application including the Baidu Cloud Manager adopts the method of dynamically implementing an application function to update a newly launched function should be included within the scope of the present application.

With the method for dynamically implementing an application function according to the present embodiment, a display window and a program control are created in the terminal device through a layout information function configuration file in the terminal device, thereby creating a link between the program control and the application function, so as to achieve fast development, adaptation, and release of the application; besides, personalized adaptation to a specific resolution, launching of a new function, and problem fixing may be implemented without releasing a new version application.

Figure 4:
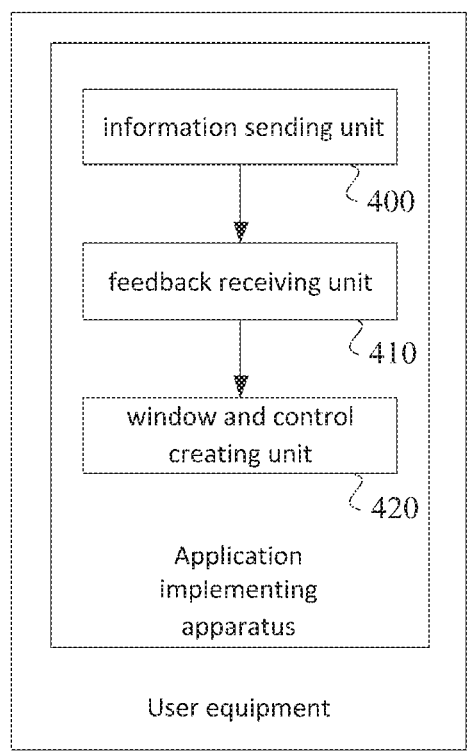
FIG. 4 illustrates a structural block diagram of an apparatus for dynamic implementing an application function according to an embodiment of the present application.

FIG. 4 illustrates a structural block diagram of an apparatus for dynamic implementing an application function according to an embodiment of the present application. The apparatus for dynamically implementing an application (hereinafter referred to as the "application implementing apparatus") includes a unit configured to transmit status information to a network device (hereinafter referred to as "information sending unit 400"), a unit configured to obtain a layout information function configuration file fed back from the network device (hereinafter referred to as "feedback receiving unit 410"), and a unit configured to create a window and program control according to the layout information function configuration file, and establish a link between the program control and the application function (hereinafter referred to as "window and control creating unit 420").

The information sending unit 400 sends status information to a network device.

Optionally, as illustrated in FIG. 7, the information sending unit 400 may first send generated authentication information to the network device, such that the network device performs authentication processing. After authentication of the user equipment according to the authentication information passes, the network device returns an authentication result to the user equipment.

If the user equipment has passed registration verification at the network device, the step of authentication may be omitted; instead, the status information is directly transmitted by the information sending unit 400 to the network device, wherein the status information may include a model, resolution, and system version number of the user equipment, as well as identification information of the application installed in the user equipment, the identification information being capable of uniquely identifying the application, including, but not limited to, a name of an application packet, a uniform resource identifier, and picture information that may uniquely identify the application, etc.

The feedback receiving unit 410 obtains a layout information function configuration file fed back from the network device.

After receiving the status information transmitted by the user equipment, the network device returns to the user equipment a service address of the layout information function configuration file corresponding to the status information. The feedback receiving unit 410 is linked to the service address to download the layout information function configuration file, the layout information function configuration file may include a layout file and a function configuration file.

The service address is for indicating the feedback receiving unit 410 to download the layout information function configuration file. Optionally, the service address may include download address information corresponding to a plurality of versions of the application under different kinds of systems, e.g., download address information corresponding to a plurality of versions of different kinds of operating systems such as a computer version, Android version, IOS version, etc.

Optionally, the feedback receiving unit configured to obtain the layout information function configuration file fed back from the network device may include:

a sub-unit configured to check whether a version number of a locally stored layout and a version number of the configuration information are synchronized with the layout information function configuration file (hereinafter referred to as "a first detecting sub-unit");

a sub-unit configured to, if not synchronous, download the layout information function configuration file (hereinafter referred to as "synchronizing sub-unit").

Optionally, the user equipment may first check, through the first detecting sub-unit, whether a version number of a locally stored layout and a version number of the configuration information are synchronized with the layout information function configuration file, before downloading the layout information function configuration file. If not synchronous, the synchronizing sub-unit downloads the layout information function configuration file; if synchronous, it is indicated that the user equipment needn't updating a local specific application.

Optionally, the sub-unit configured to download the layout information function configuration file may include:

a module configured to check the layout file and the function configuration file in the layout information function configuration file, so as to determine integrity and security of the layout information function configuration file (hereinafter referred to as the "checking module").

The user equipment may also decrypt and/or check the layout information function configuration file after downloading the layout information function configuration file, wherein the file transmitted between the user equipment and the network device may be encrypted through pre-agreed cryptograph and encryption certificate. After downloading the layout information function configuration file, the user equipment may decipher the layout information function configuration file based on the pre-agreed cryptograph and encryption certificate, so as to obtain the corresponding layout file and function configuration file. Regardless of whether the layout information function configuration file is deciphered, the user equipment may check the layout file and the function configuration file in the layout information function configuration file after downloading the layout information function configuration file, so as to determine the integrity and safety of the layout information function configuration file.

It should be noted that the example above is only for better illustrating the technical solution of the present application, not for limiting the present application. Those skilled in the art should understand that any implementation manner of receiving a layout information function configuration file fed back from the network device should be included within the scope of the present application.

The window and control creating unit 420 is configured to create a window and a program control according to the layout information function configuration file, and establish a link between the program control and the application function.

Specifically, the window and control creating unit 420 creates a window according to a layout file in the layout information function configuration file, creates respective controls and initialize statuses and contents of respective controls according to a function configuration file in the layout information function configuration file, and creates a link to an application function for respective controls of the window according to the function configuration file.

For example, a maximum resolution of the mobile terminal device supported by a mobile client of the original Baidu Cloud Manager is 1280×720. However, now mobile terminal devices with a 2K resolution (i.e., 2560×1440) have been emerged in the market; therefore, it is needed to release a mobile client for a new-version Baidu Cloud Manager so as to support mobile terminal devices with a 2K resolution.

In the present embodiment, the information sending unit 400 first sends to a network device status information including a resolution. Layout files and function configuration files corresponding to respective resolutions are stored on the network device, and are managed as a separate file directory, which guarantees separate storage of relevant files for individual resolutions, wherein the directory for saving the layout files and function configuration files with 2K resolution corresponding to the new version may be named as 2K. When determining, according to the status information, that the resolution for the corresponding user equipment is 2K, the network device sends to the user equipment the storage address for the 2K-resolution layout file and function configuration file, and the feedback receiving unit 410 downloads the 2K-resolution layout file and function configuration file from the storage address. Finally, the window and control creating unit 420 creates the window and program control for 2K resolution according to the 2K-resolution layout file and function configuration file, creates a link between the program control and the application link, such that when the user opens the mobile client of the Baidu Cloud Manager in the user equipment, the updated Baidu Cloud Manager will be displayed in the user equipment with a 2K resolution.

Figure 5:
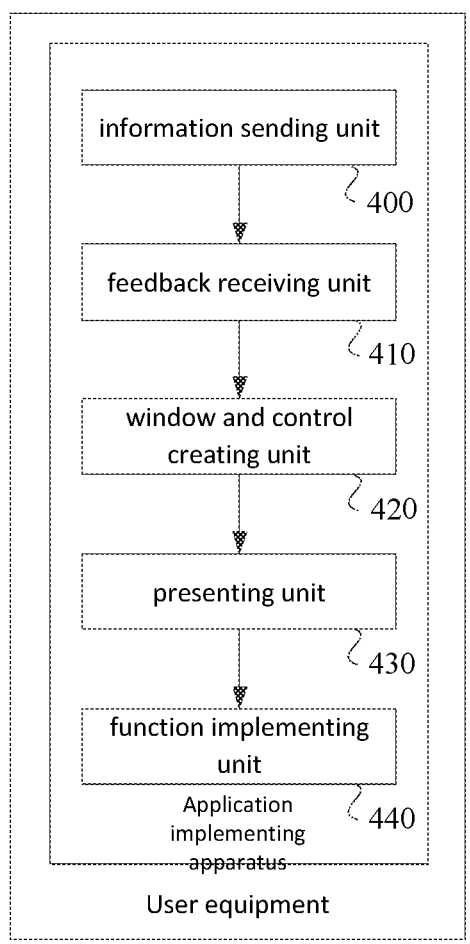
FIG. 5 illustrates a structural block diagram of an apparatus for dynamic implementing an application function according to another embodiment of the present application.

FIG. 5 illustrates a structural block diagram of an apparatus for dynamic implementing an application function (hereinafter referred to as "application implementing apparatus") according to another embodiment of the present application, wherein any explanation to the user equipment with reference to the embodiment in FIG. 4 is incorporated herein by reference.

The application implementing apparatus according to the present embodiment includes an information sending unit 400, a feedback receiving unit 410, a window and control creating unit 420, and a unit configured to present the window at a current display interface (hereinafter referred to as "presenting unit 430"), and a unit configured to involve a function interface of a program control according to an operation command so as to perform an operation on the application function (hereinafter referred to as "function implementing unit 440"), wherein the information sending unit 400, the feedback receiving unit 410, and a window and control creating unit 420 have been described in detail with reference to FIG. 4, which will not be detailed here.

The presenting unit 430 presents the window at a present display interface.

Specifically, after the user equipment completely creates a window, it may present the created window at the current display interface and initialize the window data.

Optionally, as illustrated in FIG. 8, the presenting unit 430 may include:
- a sub-unit configured to obtain a window serial number and a corresponding layout file from the layout information function configuration file (hereinafter referred to as "obtaining sub-unit");
- a sub-unit configured to, if the terminal device has the window serial number locally, read a function configuration file corresponding to the window serial number in the layout information function configuration file (hereinafter referred to as "file reading sub-unit");
- a sub-unit configured to present various controls and operation behaviors of the window on the current display interface through the function configuration file (hereinafter referred to as "operation presenting sub-unit").

Specifically, this step will be illustrated with an example that the window created by the user equipment is a login window. After the user equipment downloads the layout information function configuration file, when it is needed to present the login window, it may be first searched in a window manager whether the login window has been created. If the created login window already exists in the window manager, a layout file of the created login window is first obtained by the obtaining sub-unit from a file directory corresponding to the screen resolution of the user equipment, and a function configuration file corresponding to the serial number of the login window is obtained by the file reading sub-module from the layout file, and finally, various controls and the operation behaviors of the login window at the current display interface are presented by the operation presenting sub-unit through the function configuration file.

For example, during a procedure of initializing the login window, two tags may be created based on the function configuration file, titles of the two tags being "account number" and "password," respectively; then, two input boxes are created, one input box displaying "enter the account number," while the other input box displaying "enter the password"; finally, a "login" button is created, and then according to coordinate positions in the layout file, presenting positions of various controls are set.

Optionally, the unit configured to present the window at the current display interface may also include:
- a sub-unit configured to, if the user equipment does not have the window serial number locally, create a window corresponding to the window serial number (hereinafter referred to as "window creating sub-unit");
- a sub-unit configured to create respective controls corresponding to the window serial number based on the layout information function configuration file, and initialize parameter settings of the various controls (hereinafter referred to as "initializing sub-unit").

Specifically, if the user equipment does not have the window serial number obtained from the layout information function configuration file, it indicates that the user equipment locally does not have the window corresponding to the window serial number. Therefore, the window creating sub-unit locally creates a window corresponding to the window serial number, and the initializing sub-unit creates various controls corresponding to the window number according to the layout information function configuration file and initializes parameter settings of various controls.

An example of adding a "BT download button" on a mobile client of Baidu Cloud Manager will be taken. Since the current mobile client does not provide a function of BT download, while the Baidu Cloud Server already adds a BT download function to an offline download function, it is only needed to add a "BT download button" on the mobile client of the Baidu Cloud Manager, and associate a click event for the button with obtaining a specific file from the Baidu Cloud Server through "BT Download." Specifically, after the window creating sub-unit creates a window corresponding to the "BT download button," the initializing sub-unit creates various controls corresponding to the "BT download button" according to the layout information function configuration file of BT download, and initializes parameter settings of the various controls, thereby performing an operation of adding a "BT download button" to the mobile client of the Baidu Cloud.

The function implementing unit 440 invokes a function interface of the program control according to an operation command to perform an operation on the application function.

Specifically, in the current displayed login window, the user sends a login request signaling by clicking onto a "login" button; then when the window creating sub-unit creates the "login" button in the login window, a click event corresponding to the "login" button may be associated with a Send Request operation, and associated with obtaining information such as a service path address associated with the login request from the function configuration file. When clicking onto the "login" button, the function implementing unit 440 activates the Send Request operation, and sets a login service path address, and meanwhile obtains the currently entered user account number and password in the meanwhile, completes initiation of the login command, and performs window jump processing or information prompt according to a login result as returned.

A user's operation of logging in the Baidu Cloud Manager will be taken as an example. When the user enters a Baidu account number and password in "Account Number" and "Password" input boxes, respectively, and clicks onto the "login" button, the function implementing unit displays the data stored in Baidu Cloud in the window according to a Baidu Cloud service path address corresponding to the Baidu account number and password, thereby implementing an operation on an application function of the Baidu Cloud.

It should be noted that the example above is only for better understanding the technical solution of the present application, not for limiting the present application. Those skilled in the art should understand that any manner in which a window including the login window employs the method above to dynamically implement an application function should be included within a scope of the present application.

Figure 6:
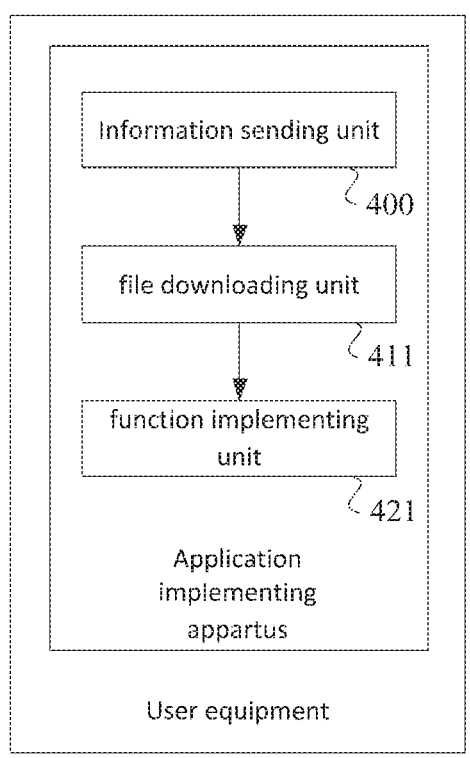
FIG. 6 illustrates a structural block diagram of an apparatus for dynamic implementing an application function according to another embodiment of the present application.

FIG. 6 illustrates a structural block diagram of an application for dynamic implementing an application function according to another embodiment of the present application, wherein any explanation of the user equipment in the embodiment with reference to FIG. 4 is incorporated here by reference.

The application implementing apparatus in the present embodiment includes an information sending unit 400, a feedback receiving unit 410, and a window and control creating unit 420. Wherein, the feedback receiving unit 410 further includes a sub-unit configured to download a Lua script file from a network device and check the Lua script file (hereinafter referred to as "file downloading sub-unit 411"), and the window and control creating unit 420 further includes a sub-unit configured to invoke the Lua script file according to the user's operation command so as to perform operations of the application function (hereinafter referred to as "function implementing sub-unit 421"). The step S100 has been described in detail in FIG. 1, which will not be detailed here. Wherein, the information sending unit 400, the feedback receiving unit 410, and the window and control creating unit 420 have been described in detail with reference to FIG. 4, which will not be detailed here.

If the layout information function configuration file further includes a Lua script file, the file downloading sub-unit 411 downloads the Lua script file from the network device and checks the Lua script file.

The Lua script file is a script language embedded in an application so as to provide a flexible and customized function for the application. Through the Lua script file, extension of a new function of the application may be achieved.

Specifically, after receiving the status information sent by the user equipment, the network device returns to the user equipment a service address of the layout information function configuration file corresponding to the status information. The file downloading sub-unit 411 is linked to the service address to download the layout information function configuration file, the layout information function configuration file includes a layout file, a function configuration file, and a Lua script file.

Optionally, the user equipment may check the Lua script file in the layout information function configuration file through the file downloading sub-unit 411 after downloading the layout information function configuration file, so as to determine the integrity and safety of the layout information function configuration file.

It should be noted that the example above is only for better illustrating the technical solution of the present application, not for limiting the present application. Those skilled in the art should understand that any implementation manner of receiving a layout information function configuration file fed back from the network device should be included within the scope of the present application.

The function implementing sub-unit 421 creates a window and a program control according to the layout file, the function configuration file, and the Lua script file in the layout information function configuration file, and establishes a link between the program control and the application function.

Specifically, as illustrated in FIG. 9, the function implementing sub-unit 421 creates a window according to a layout file in the layout information function configuration file, creates various controls according to a function configuration file, and initializes various control states. If the layout information function configuration file has a Lua file, the window is parsed to load data request information; and if the data request information exists, the window data loading interface initiates a data request, and initializes window presenting data according to a feedback to the data request. Finally, the function implementing sub-unit 421 presents the window.

An example of adding an automatic cloud backup function to the client of the Baidu Cloud Manager is taken. Because the current Baidu Cloud Manager does not have an automatic cloud backup function, while the new version Baidu Cloud Manager client has been added the automatic cloud backup function. In the embodiment, the automatic cloud backup function is implemented through extending of the Lua script file, and the Lua script file is managed and maintained by the network device. After the user equipment installed with an old version client of the Baidu Cloud Manager obtains, through the file downloading sub-unit 411, a layout information function configuration file including a layout file, a function configuration file, and a Lua script file from the network device, it may first create a button named "automatic cloud backup" through a layout file, and update the "automatic cloud backup" button to a right-lower corner of the main window of the Baidu Cloud Manager client; then creates an "automatic backup" address directory at the user equipment through the function configuration file, e.g., creating a folder named "automatic backup" under a root directory; finally, the function implementing sub-unit 421 creates a link between the "automatic backup" folder and the Baidu Cloud Server through the Lua script file, and sets that the data in the "automatic backup" folder is synchronized with a Baidu Cloud database every a predetermined time, without a need of downloading a new version Baidu Cloud client installation file, and launching of the automatic cloud backup function may be implemented only by downloading the layout information function configuration file.

It should be noted that the above example is only for better illustrating the technical solution of the present application, not for limiting the present application. Those skilled in the art should understand that any manner in which any application including Baidu Cloud Manager adopts the embodiment of dynamically implementing an application function to update a newly launched function should be included within the scope of the present application.

With the apparatus for dynamically implementing an application function according to the present embodiment, a display window and a program control are created in the terminal device through a layout information function configuration file in the terminal device, thereby creating a link between the program control and the application function, so as to achieve fast development, adaptation, and release of the application; besides, personalized adaptation to a specific resolution, launching of a new function, and problem fixing may be implemented without releasing a new version application.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

For those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically illustrated and described above, those skilled in the art will understand that without departing from the spirit and scope of the claims, their forms and details may change somewhat. Here, the protection as sought is defined in the appended claims. These and other aspects of respective embodiments are prescribed in the following numbered clauses:

1. A method for dynamically implementing an application function, wherein the method comprises:
   sending status information to a network device;
   obtaining a layout information function configuration file fed back from the network device; and
   creating a window and a program control based on the layout information function configuration file and establishing a link between the program control and the application function.

2. The method of Clause 1, further comprising:
   presenting the window at a current display interface;
   invoking a function interface of the program control according to an operation command so as to perform an operation of the application function.

3. The method of clause 2, wherein the step of presenting the window at the current display interface comprises:
   obtaining a window serial number and a corresponding layout file from the layout information function configuration file;
   if the terminal device locally has the window serial number, reading a function configuration file corresponding to the window serial number in the layout information function configuration file;
   presenting various controls and operation behaviors of the window at the current display interface through the function configuration file.

4. The method of clause 3, wherein the step of presenting the window at the current display interface further comprises:
   if the user equipment locally does not have the window serial number, creating a window corresponding to the window serial number;
   creating various controls corresponding to the window serial number according to the layout information function configuration file and initializing parameter settings of various controls.

5. The method of clause 1, wherein the step of obtaining a layout information function configuration file as fed back from the network device comprises:
   detecting whether a version number of layout and a version number of configuration information locally stored by the user equipment are synchronized with the layout information function configuration file;
   if not synchronous, downloading the layout information function configuration file.

6. The method of clause 5, wherein the step of downloading the layout information function configuration file comprises:
   checking the layout file and function configuration file in the layout information function configuration file to determine integrity and security of the layout information function configuration file.

7. The method of clause 5, wherein if the layout information function configuration file further comprises a Lua script file, the step of downloading the layout information function configuration file from the network further comprises:
   downloading the Lua script file from the network device and checking the Lua script file.

8. The method of clause 7, wherein the step of creating a window and a program control based on the layout information function configuration file and establishing a link between the program control and the application function comprises:
   invoking the Lua script file according to an operation command to implement an operation of the application function.

9. An apparatus for dynamically implementing an application function, wherein the apparatus comprises:
   a unit configured to send status information to a network device;
   a unit configured to obtain a layout information function configuration file fed back from the network device; and
   a unit configured to create a window and a program control based on the layout information function configuration file and establish a link between the program control and the application function.

10. The apparatus of Clause 9, further comprising:
    a unit configured to present the window at a current display interface;
    a unit configured to invoke a function interface of the program control according to an operation command so as to perform an operation of the application function.

11. The apparatus of clause 10, wherein the unit configured to present the window at the current display interface comprises:
    a sub-unit configured to obtain a window serial number and a corresponding layout file from the layout information function configuration file;
    a sub-unit configured to, if the terminal device locally has the window serial number, read a function configuration file corresponding to the window serial number in the layout information function configuration file;
    a sub-unit configured to present various controls and operation behaviors of the window at the current display interface through the function configuration file.

12. The apparatus of clause 11, wherein the unit configured to present the window at the current display interface further comprises:
    a sub-unit configured to, if the user equipment locally does not have the window serial number, create a window corresponding to the window serial number;
    a sub-unit configured to create various controls corresponding to the window serial number according to the layout information function configuration file and initialize parameter settings of various controls.

13. The apparatus of clause 9, wherein the unit configured to obtain a layout information function configuration file as fed back from the network device comprises:

a sub-unit configured to detect whether a version number of layout and a version number of configuration information locally stored by the user equipment are synchronized with the layout information function configuration file;

a sub-unit configured to, if not synchronous, download the layout information function configuration file.

14. The apparatus of clause 13, wherein the sub-unit configured to download the layout information function configuration file comprises:

a module configured to check the layout file and function configuration file in the layout information function configuration file to determine integrity and security of the layout information function configuration file.

15. The apparatus of clause 14, wherein if the layout information function configuration file further comprises a Lua script file, the sub-unit configured to download the layout information function configuration file from the network further comprises:

a module configured to download the Lua script file from the network device and check the Lua script file.

16. The apparatus of clause 15, wherein the unit configured to create a window and a program control based on the layout information function configuration file and establish a link between the program control and the application function comprises:

a sub-unit configured to invoke the Lua script file according to an operation command to implement an operation of the application function.

What is claimed is:

1. A method for dynamically implementing an application function, wherein the method comprises:

sending, by a terminal device, status information comprising identification information of a client application with an old application function to a network device, the client application being installed on the terminal device, and the network device comprising a memory that stores a layout information function configuration file for achieving a new application function different from the old application function;

obtaining, by the terminal device, the layout information function configuration file fed back from the network device; and creating, by the terminal device, a window and a program control based on the layout information function configuration file and establishing a link between the program control and the old application function to enable the client application to achieve the new application function, wherein the obtaining the layout information function configuration file as fed back from the network device comprises: detecting whether a version number of layout and a version number of configuration information locally stored by the terminal device are synchronized with the layout information function configuration file; and if not synchronous, downloading the layout information function configuration file.

2. The method according to claim 1, further comprising: presenting the window at a current display interface; and invoking a function interface of the program control according to an operation command so as to perform an operation of the new application function.

3. The method according to claim 2, wherein the step of presenting the window at the current display interface comprises: obtaining a window serial number and a corresponding layout file from the layout information function configuration file; if the terminal device locally has the window serial number, reading a function configuration file corresponding to the window serial number in the layout information function configuration file; and presenting various controls and operation behaviors of the window at the current display interface through the function configuration file.

4. The method according to claim 3, wherein the step of presenting the window at the current display interface further comprises: if the terminal device locally does not have the window serial number, creating a window corresponding to the window serial number; and creating various controls corresponding to the window serial number according to the layout information function configuration file and initializing parameter settings of various controls.

5. The method according to claim 1, wherein the step of downloading the layout information function configuration file comprises: deciphering or checking the layout file and the function configuration file in the layout information function configuration file to determine integrity and security of the layout information function configuration file.

6. The method according to claim 5, wherein the step of creating a window and a program control based on the layout information function configuration file and establishing a link between the program control and the old application function comprises: invoking a Lua script file according to an operation command to implement an operation of the new application function.

7. A computer device, comprising: a processor and a memory, the memory storing computer codes, the processor being configured to, by executing the computer codes, execute a method for dynamically implementing an application function, the method comprises the following steps:

sending status information comprising identification information of a client application with an old application function to a network device, the client application being installed on the terminal device, and the network device comprising a memory that stores a layout information function configuration file for achieving a new application function different from the old application function;

obtaining the layout information function configuration file fed back from the network device; and creating a window and a program control based on the layout information function configuration file and establishing a link between the program control and the old application function to enable the client application to achieve the new application function, wherein the obtaining the layout information function configuration file as fed back from the network device comprises: detecting whether a version number of layout and a version number of configuration information locally stored by the terminal device are synchronized with the layout information function configuration file; and if not synchronous, downloading the layout information function configuration file.

8. The computer device according to claim 7, the method further comprising: presenting the window at a current display interface; and invoking a function interface of the program control according to an operation command so as to perform an operation of the new application function.

9. The computer device according to claim 8, wherein the step of presenting the window at the current display interface comprises: obtaining a window serial number and a corresponding layout file from the layout information function configuration file; if the computer device locally has the window serial number, reading a function configuration file corresponding to the window serial number in the layout information function configuration file; and presenting various controls and operation behaviors of the window at the current display interface through the function configuration file.

10. The computer device according to claim 9, wherein the step of presenting the window at the current display interface further comprises: if the computer device locally does not have the window serial number, creating a window corresponding to the window serial number; and creating various controls corresponding to the window serial number according to the layout information function configuration file and initialize parameter settings of various controls.

11. The computer device according to claim 7, wherein the step of downloading the layout information function configuration file comprises: deciphering or checking the layout file and the function configuration file in the layout information function configuration file to determine integrity and security of the layout information function configuration file.

12. The computer device according to claim 11, wherein if the layout information function configuration file further comprises a Lua script file, the step of downloading the layout information function configuration file from the network further comprises: downloading the Lua script file from the network device and check the Lua script file.

13. The computer device according to claim 12, wherein the step of creating a window and a program control based on the layout information function configuration file and establishing a link between the program control and the old application function comprises: invoking the Lua script file according to an operation command to implement an operation of the new application function.

14. A non-volatile computer readable non-transitory medium that comprises computer codes which, when being executed, cause a method for dynamically implementing an application function to be executed, the method comprising the following steps:

sending status information comprising identification information of a client application with an old application function to a network device, the client application being installed on the terminal device, and the network device comprising a processor and a memory that stores a layout information function configuration file for achieving a new application function different from the old application function;

obtaining the layout information function configuration file fed back from the network device; and creating a window and a program control based on the layout information function configuration file and establishing a link between the program control and the old application function to enable the client application to achieve the new application function, wherein the obtaining the layout information function configuration file as fed back from the network device comprises: detecting whether a version number of layout and a version number of configuration information locally stored by the terminal device are synchronized with the layout information function configuration file; and if not synchronous, downloading the layout information function configuration file.

15. An apparatus for dynamically implementing an application function, wherein the apparatus comprises:

a unit configured to send status information comprising identification information of a client application with an old application function to a network device, the client application being installed on the terminal device, and the network device comprising a memory that stores a layout information function configuration file for achieving a new application function different from the old application function;

a unit configured to obtain the layout information function configuration file fed back from the network device; and a unit configured to create a window and a program control based on the layout information function configuration file and establishing a link between the program control and the old application function to enable the client application to achieve the new application function, wherein the obtaining the layout information function configuration file as fed back from the network device comprises: detecting whether a version number of layout and a version number of configuration information locally stored by the terminal device are synchronized with the layout information function configuration file; and if not synchronous, downloading the layout information function configuration file.

* * * * *